Jan. 13, 1925. 1,523,330
C. B. WOODWORTH
ANTISKID OR TRACTION DEVICE FOR VEHICLE WHEELS
Filed Oct. 6, 1920   2 Sheets-Sheet 1
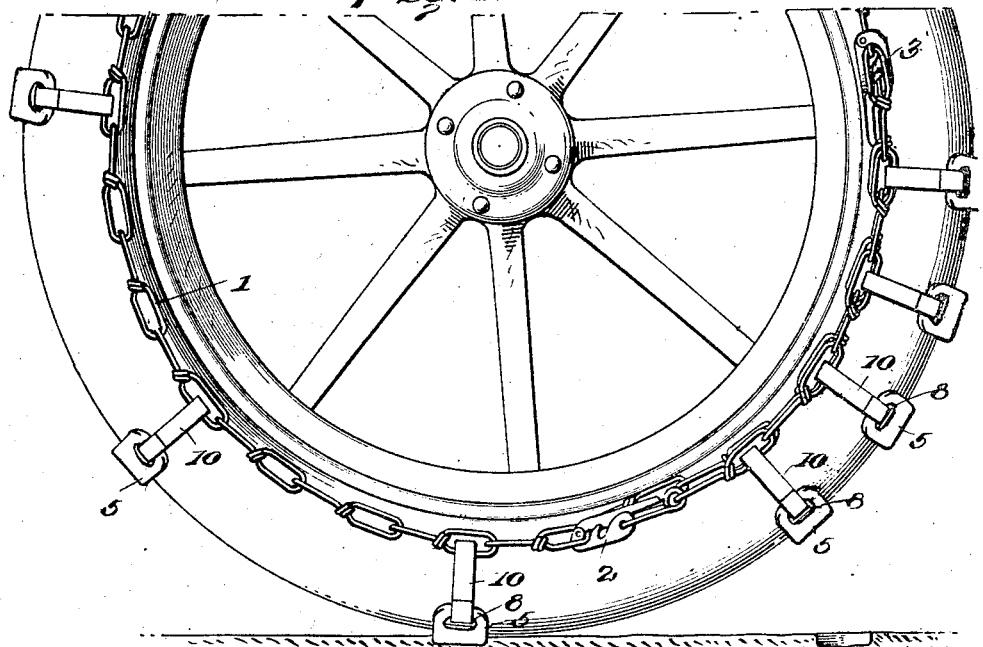
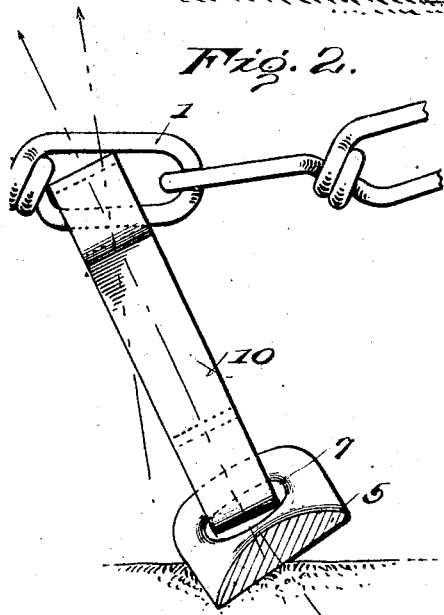
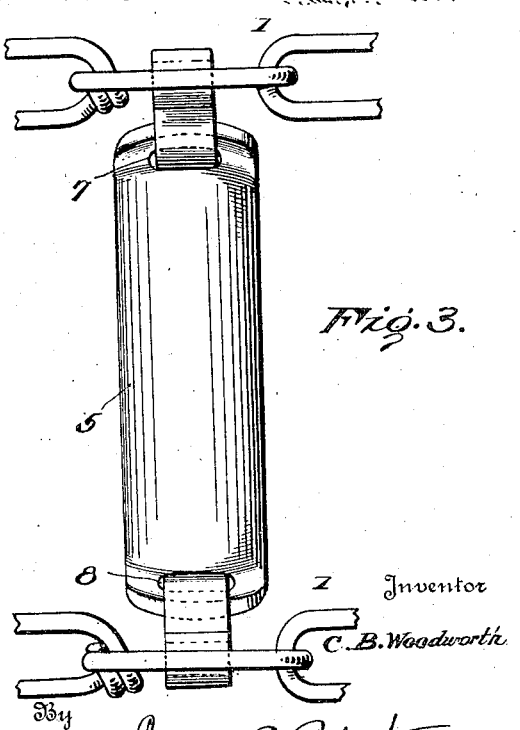
Inventor
C. B. Woodworth
By Thomas E. Robertson, Attorney

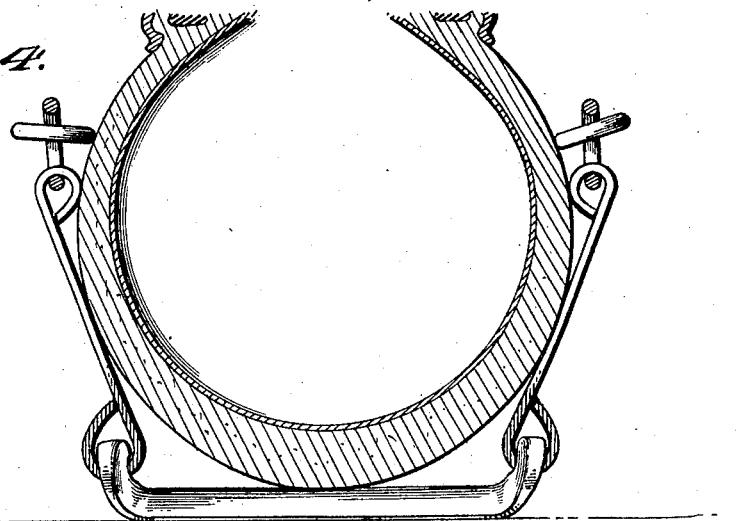

Patented Jan. 13, 1925.

1,523,330

UNITED STATES PATENT OFFICE.

CHARLES B. WOODWORTH, OF NIAGARA FALLS, NEW YORK.

ANTISKID OR TRACTION DEVICE FOR VEHICLE WHEELS.

Application filed October 6, 1920. Serial No. 415,083.

*To all whom it may concern:*

Be it known that I, CHARLES B. WOODWORTH, a subject of the King of Great Britain, residing at Niagara Falls, in the county of Niagara and the State of New York, have invented certain new and useful Improvements in Antiskid or Traction Devices for Vehicle Wheels, of which the following is a specification.

This invention pertains to detachable antiskid or traction devices especially intended for use on soft or slippery roads and has for its purpose to provide a device that will cause the least possible wear on the tire, that will give long wear, that will cause no bumping, that will take a deep hold on soft road surfaces, and, in a comparatively few sizes, will fit the numerous sizes of tires.

In my preferred construction, I use as a gripping member on that part of the tire which comes in contact with the road, a strip extending across the tire made of what is known as half oval steel, having its convex side next to the tire, with holes or openings through each end, into which links are connected for holding it in place and having its ends bent up to raise them away from the road so that the links connected into each end of them will not be worn by the road when running on hard road surfaces. This half oval steel has the advantage over a concavo-convex member of not flattening under heavy loads and of giving much longer wear.

The links at each end of the cross members which hold them in place are loosely connected to the cross member so as to allow the cross member to rock to a certain extent on the tire but not loosely enough to allow it to turn over or turn up so that its edges will cut into the tire. The object of this loose connection is to allow the gripping members to lie flat on the road when there is no tendency for the wheels to slip or spin from the driving force and thus there will be practically no wear on the tire and no bumping as the tire rolls over the gripping member. When, however, the wheels begin to slip from the driving force, the pull on the rear edge of the gripping member will cause it to rock on the tire making the rear edge roll away from the tire and dig into the road so as to obtain a deep hold.

I am aware that antiskid and traction devices having flat gripping members have been made in the past, but these have either been held flat against the tire so that they could not rock, as in my device, or have been held with chain at each end in such a way that they could turn over on the tire when loose or when there was sufficient strain to cause one edge to compress the tire.

The links connected at each end of the gripping members are fastened at even distances apart to side chains, which hold the gripping members in place on the tire and in order to allow the chains to be adjusted to wheels of different diameters or to wheels having both new tires and tires that have been worn, and also as a precaution to prevent the chains coming unfastened, I provide at both ends of the side chains on each side, fasteners for connecting into the side links. This makes it possible to overlap the ends on wheels of small diameter, in which case there will be at the overlapping ends, for a short distance, two side chains on each side and a double number of gripping members on the tread of the tire. These extra gripping members will not be objectionable and this construction will make it possible, with a very few sizes of chains, to fit all tires.

In my preferred construction, I show the gripping member with holes at each end of it, into which the links are connected. The rocking action, however, can be obtained by curling over the ends of the gripping members and fitting them into curved openings in the links at each end, or by forming the ends in a sort of T shape and having links at each end loosely fitted over them, or the links may be made short and be fastened to other links in which they can move so as to allow the rocking motion of the gripping member.

The invention consists in the construction and arrangement of parts hereinafter more particularly described and then definitely claimed.

In the drawings accompanying and forming part hereof:

Figure 1 is a side elevation of part of a wheel having my invention applied thereto Figure 2 is an enlarged fragmentary view, showing a link, a portion of one chain in elevation and the gripping member in transverse section.

Figure 3 is a view of the same in plan, showing two links and the gripping member complete and fragments of the two side chains.

Figure 4 is a transverse section through the tire showing my antiskid device applied and in place.

Figures 5 and 6 are fragmentary end and side views respectively showing a slight modification in structure between links and gripping member.

Figures 7 and 8 are fragmentary end and side views respectively showing a slight modification in which the end slot is reversely curved in the link and the end of the gripping member is hooked in the slot, and Figures 9 and 10 are fragmentary end and side views respectively of a form of joint in which the end of the gripping member terminates in a T and the link is bifurcated with its ends bent around the curved pintle of the T.

Referring now to the details of the drawings by numerals: 1 designates a chain similar to those now in common use except that each end is provided with a fastener as 2 and 3. I use a fastener at each end of the chain in order to allow the chain to be adjusted to wheels of different diameters or to wheels having both new tires and tires that have been worn, and also as a protection from the chains becoming unfastened. When the chain is used on a small size wheel, there will be an overlapping of the ends of the chain for a short distance as illustrated in Figure 1.

In the preferred embodiment of my invention, the gripping member is formed from a strip of what is known as half oval steel and from such material I form the gripping members 5 so constructed that the convex side is next to the tire while the ends of the gripping member are provided with openings 7 and 8 into which links are connected for holding the gripping member in place, the ends of the gripping member being bent to raise them away from the road so that the links connected into each end of them would not be worn by the road when running on hard road surfaces. Another important feature is the making of the gripping member of much greater width than thickness so that when it lies flat on the ground, as it will on hard road surfaces, it will be comparatively thin for the tire to roll over, but when the wheel begins to slip on soft surfaces the gripping member will turn so that its greater width will cause it to take a much greater grip on the road, as clearly illustrated in Figure 2. Another feature of the invention is to so connect the bent ends of the gripping member with the side links, and the side links to the chain, that, although the cross member can tilt as illustrated in Figure 2, it can tilt only to a certain limited extent and cannot turn over entirely. Thus, the openings 7 and 8 in the turned up ends of the gripping member permit of a limited play only on the side links 10, as illustrated in Figure 2, and likewise the links of the chain 1 are also formed so that the ends of the links can have only a limited play therein (see Figure 2).

Instead of making the turned up ends of the gripping member as illustrated in Figures 1, 2, 3 and 4, they may be made of other forms, such as shown in Figures 5 to 10 inclusive. In Figure 5, the turned up end is provided with a curved slot as 12 while in Figure 7 the slot is curved in the opposite direction as shown at 14. In Figure 9 the gripping member is provided with what might be called a T-shaped end 16 fitting into loops 17 and 18 of the side links so as to permit a slight rocking movement therein.

From the foregoing and the accompanying drawings, it will be seen that I have provided an antiskid or traction device for vehicle wheels in which the gripping member is of much greater width than thickness so that it can rest flat on the ground for use on hard road surfaces and yet is of comparatively thin material so that the tire can roll over it but when the wheel begins to slip on soft surfaces the gripping members will turn so that their greater width will cause them to take a much deeper hold on the road. It will also be seen that though the gripping member is so connected that it will turn so that its greater width will take a much deeper hold on the road, its tilting or turning movement is restricted or limited so that it cannot turn entirely over.

Although I show the gripping members attached to side chains I do not limit myself to any method of holding the gripping members in place for they may be fastened in other ways.

What I claim as my invention is:

1. A gripping member for an antiskid device adapted to be held lengthwise against complete rotation across the tire composed of a solid piece of metal substantially straight throughout its length and having a convex surface next to the tire and a substantially flat surface next to the road.

2. A gripping member for an antiskid device adapted to be held lengthwise against complete rotation across the tire composed of a solid piece of metal substantially straight throughout its length and constructed to rock on the surface of the tire to a limited extent only.

3. A gripping member for an antiskid or traction device adapted to be held lengthwise against complete rotation across the tire composed of a solid piece of metal substantially straight throughout its length and having a convex surface next to the tire adapted to rock on the tire to allow one edge to dig into the road and a substantially flat surface next to the road.

4. A gripping member for an antiskid device, of greater width than thickness, said member having its ends bent with slots therein, and side links engaging the slotted ends of the gripping member permitting said member to rock on the surface of the tire to a limited extent only.

5. A substantially straight gripping member for an antiskid or traction device adapted to be held lengthwise across the tire and having a convex surface next to the tire, said gripping member having its ends bent with slots therein, and side links for engagement with said slotted ends, the slotted connection limiting the rocking motion of the gripping member on the surface of the tire.

6. A gripping member for an antiskid or traction device adapted to be held lengthwise across the tire composed of a solid piece of metal substantially straight throughout its length and being of greater width than thickness, and means for holding said gripping member in position on the tire to permit the gripping device to turn to a limited extent only to obtain a deep hold on soft roads.

7. An antiskid or traction device for vehicle wheels consisting of cross members and side members, having attaching means at both ends of the side members, whereby the device may be adjusted to different sizes of wheels by overlapping the ends to a greater or less extent.

8. An antiskid device for vehicle wheels including a gripping member convex on one side and flat on the opposite side and straight approximately throughout its length, and means of attachment therefor to the wheel which admits of a controlled rocking movement.

9. An antiskid device for vehicle wheels including a gripping member convex on one side and flat on the opposite side and straight approximately throughout its length and means of connection to the wheel which permits the member to rock a limited amount but precludes a complete rotation.

10. An antiskid device for vehicles including a gripping member straight approximately throughout its length, flat on its outer surface and convex on the surface next to the wheel, the gripping member disposed transversely of the wheel and means for so connecting the ends of the gripping member to the wheel that a limited rocking movement is permitted but complete axial rotation with respect to the tire is precluded.

11. An antiskid device for vehicles including a gripping member, convex on one side and flat on the opposite side, side chains, and links extending from the side chains and connected to the ends of the gripping member.

In testimony whereof I affix my signature.

CHARLES B. WOODWORTH.